Patented Jan. 13, 1931

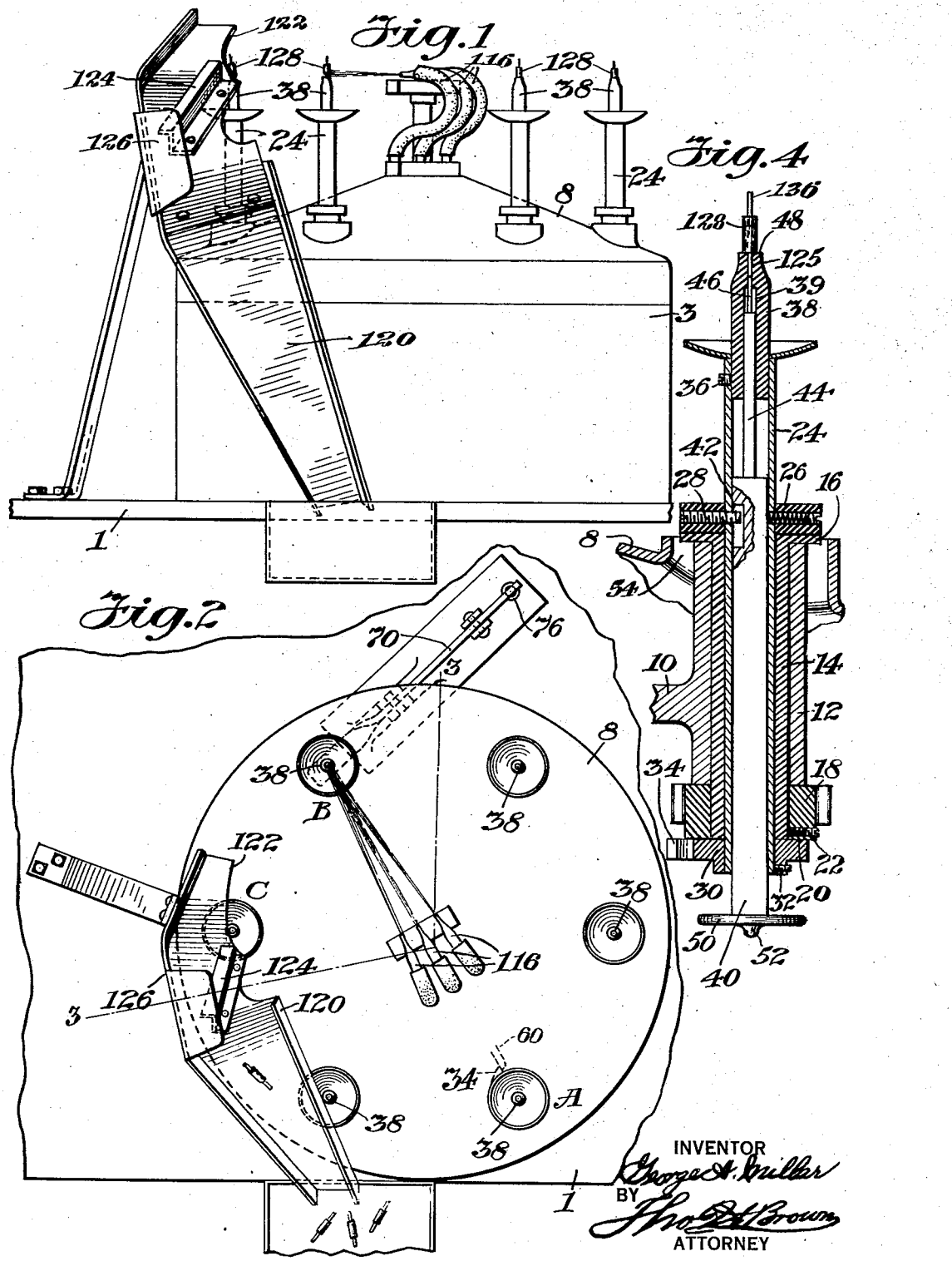

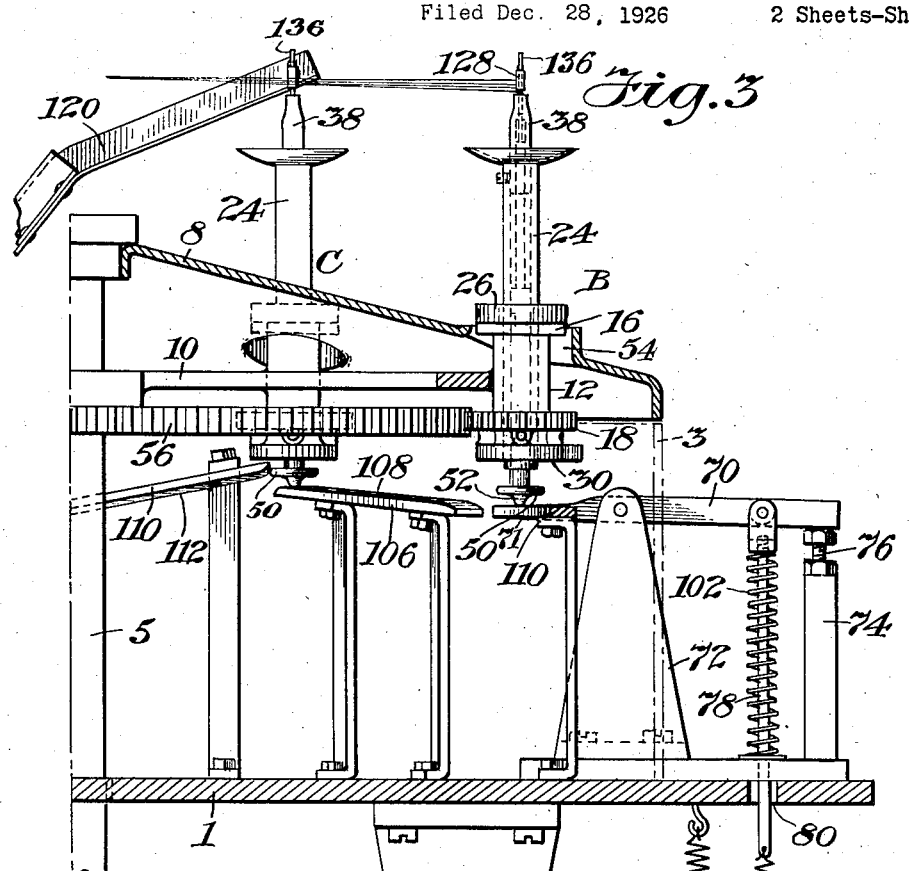
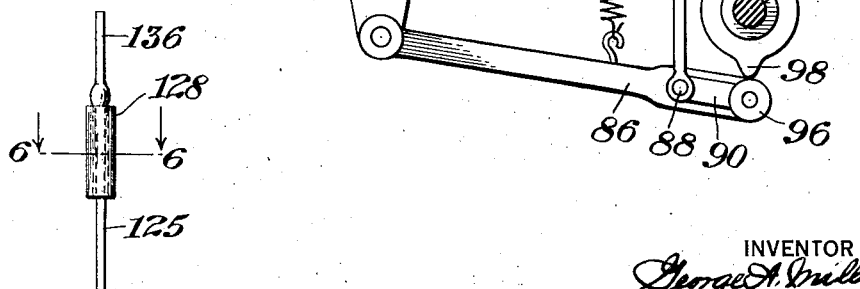

1,789,014

UNITED STATES PATENT OFFICE

GEORGE A. MILLAR, OF RIDGEFIELD PARK, NEW JERSEY, ASSIGNOR TO GENERAL ELECTRIC VAPOR LAMP COMPANY, OF HOBOKEN, NEW JERSEY, A CORPORATION OF NEW JERSEY

GLASS-WORKING MACHINE

Application filed December 28, 1926. Serial No. 157,484.

The present invention relates to automatic machinery for handling glass parts and other parts associated therewith and for working the glass during such automatic handling.

Various objects and advantages of the invention will be obvious from the following particular description of one form of machine embodying the invention or from an inspection of the accompanying drawings; and the invention also consists in certain new and useful features of construction and combinations of parts hereinafter set forth and claimed.

In the accompanying drawings there is shown for purposes of illustration forms of mechanism embodying the invention, in which, Fig. 1 is an elevation view, Fig. 2 is a plan view, Fig. 3 is a vertical elevation view in section taken along the line 3—3 of Fig. 2, Fig. 4 is an elevation view in mid-section showing enlarged details of a holding and moving means for the parts handled, and Figs. 5 and 6 are respectively, an elevation view and a transverse sectional view along the line 6—6 of Fig. 5 of the parts handled by the machine of the invention.

In the drawings the support 1 carries a circular stationary casing 3 between the walls of which are assembled a part of the actuating and controlling mechanism parts. Concentrically with said casing 3 is mounted the vertical shaft or spindle 5 which carries the turret cap or head 8 which is rotatable thereby above said casing. Said shaft 5 also carries a spider 10 having a number of equally spaced arms, in this case as illustrated six arms, each of which carries equi-distantly from the center of the shaft 5 a vertical boss or bushing 12. Each of said bushings 12 carries a sleeve 14 which extends through the bore thereof and which has at its upper end a collar 16 fixed thereto which rests on the upper end of said boss 12. Each of said sleeves 14 has mounted below the respective boss 12 a pinion 18 slidable rotatably on said sleeve 14 and having a spring 20 held by a set screw 22 in frictional engagement with said sleeve 14. Another sleeve 24 is mounted in slidable relation in the bore of said sleeve 14 and is held in position by a collar 26 resting on said collar 16 and held in position by a set screw 28 which extends through the side of said sleeve 24, and also by a collar 30 which also serves to hold said pinion 18 on said sleeve 14, the set screw 32 serving to hold said collar 30 in position. A dog 34 formed on said collar 30 serves in certain positions and operations of the device as hereinafter described to hold said collar 30 and said sleeve 24 and other parts associated therewith against rotation with said pinion 18. At the upper end of said sleeve 24 is mounted by means of the set screw 36 the sleeve or bushing 38 having a bore 39 co-axial with that of sleeve 24 and connecting therewith. The bore of sleeve 38 as shown in the embodiment illustrated is smaller at its upper end than at the lower end. In said sleeve 24 is slidably mounted the spindle 40 and into longitudinal channel 42 formed therein extends the inner end of said set screw 28 for limiting the slidable movement of said spindle in either direction. Extending upwardly and co-axially from said spindle 40 and into the lower part of said bore 39 is the spindle 44 which in turn carries a thin wire or spindle 46 which extends into the upper portion of said bore 39. The length of said channel 42 is sufficient to permit the movement of said wire spindle 46 from a position appreciably below the upper surface 48 of said sleeve 38 upwardly to a position close to or slightly above said surface 48. At its lower end said spindle 40 carries a concentric flange 50 and below that a cam engaging dog or boss 52. As shown in the drawing the upper end of said boss 12 extends through a corresponding opening 54 in said head 8 whereby said bushing 38 is carried above said head 8. On said shaft 5 but free to rotate thereon is the gear 56 which meshes with each of said pinions 18 and which is driven in a suitable manner by means not shown. Within said turret at a position denoted by A in Fig. 2 of the drawing is mounted a dog 60 in operable relation to the dog 34 of a spindle set when in said position A. Said dog 60 is stationarily mounted with an engaging face extending substantially radially from the axis of said shaft 5. At a position B which is 180° away from position A and extending through an opening in the side of said turret 3 is mounted a lever 70 pivoted to the standard 72 and having an operating end 71 below a boss 52 when at the position B. The upper limit of motion of said operating end 71 of lever 70 is determined by a standard 74 mounted at the opposite end of said lever 70 where a set screw 76 is adjustable for regulating the lower limit of movement of said opposite end of lever 78. A connecting rod 78 pivoted to said opposite end of lever 70 extends downwardly through an opening 80 in said bed 1 and connects through a tension spring 82 to a second connecting rod 84 whose lower end makes sliding connection with a lever 86 by means of a pin 88 on said rod 84 and a slot 90 in said lever 86. A bracket 92 mounted to said bed 1 pivotally supports said lever 86 and a tension spring 94 connected at one end to said bed 1 and at its other to said lever 86 tends to hold a roller 96 mounted at said slotted end of said lever 86 against a cam 98 carried by a shaft 100 which has a suitable time gear connection not shown with said shaft 5 for driving said cam in a predetermined relation with said turret head and other parts in a manner hereinafter fully described. A compression spring 102 mounted about said rod 78 with its lower end bearing against said bed 1 and its upper end against said rod 78 tends to hold the actuating end 71 of said lever 70 in a depressed position.

Mounted at a position commencing at a small angular distance in a counter clockwise position from said position B and extending in a counter clockwise direction to a position of substantially 60° from position B to a position C is a cam member 106 having an upper cam surface 108 commencing at a level slightly below that of the upper position of the actuating end 71 of said lever 70 and rising progressively to a given distance at said position C. Commencing at a position just counter clockwise of the termination of said member 106 is the cam member 110 which extends arcuately in a counter clockwise direction with its inner edge on a radius slightly greater than the radius of movement of an outer edge of said spindle 40 about said shaft 5 and continues around to a terminating point at a position just clockwise from the operating end of said lever 70. At said position C the lower surface 112 of said member 110, which is the cam surface thereof, is at the level or slightly above the level of the upper surface of said flange 50 when said member 108 holds spindle 40 at the operating position of said position C. From this level said cam surface 112 declines to a lowermost position which is at a level which will bring the lower limit of said boss 52 to or slightly above the lower limiting position of the operating end 71 of said lever 70. This lowermost level of said cam surface 112 commences preferably at or before said position A, at which position the device is loaded and where the dog 60 operates to hold said sleeves 24 and 38 against rotation. It is to be understood, however, that when desired and suitable said dog 60 and the corresponding dog 34 can be dispensed with because for some uses the device can be loaded while said spindles 24 and 38 are rotating. A set of gas jets 116 is mounted to converge flames therefrom at a point above the center of said sleeve 38 when in said position B. Near said position C is mounted a chute 120 having an edge 122 which tapers or curves inwardly and in a counter clockwise direction from a position back of said position C to a point just past said position C and in close proximity to or traversing the position of a wire vertically held extending from said sleeve 38 when at or approaching said position C. Guide members 124 and 126 are carried by chute 120.

In the use and operation of the embodiment of this invention shown in the drawing and described above the shaft 5, said gear 56 and said cam 98 are rotated by suitable means not shown at certain relative speeds to bring about the hereinafter described operation of the machine. The said spider 10 is rotated in intermittent steps to bring the parts carried by said bushing 12 into said positions A, B and C and intermediate positions and to hold them therein for a period of time suitable for the melting and fusing of glass by flames on said jets 116, said periods being for example, say 10 to 20 seconds or more or less. During such rotation of said spider 10 in intermittent steps said gear 56 is continuously rotated at a speed to drive said pinions 18 at about 300 revolutions per minute or more or less. At position A through the engagement of said flange 50 by said cam member 110 said wire spindle 46 is at its lowermost position, and this position A is designated as the loading position of the machine. In this position A said dog 60 engages said dog 34 and holds spindles 24 and 38 stationary against the frictional rotational engagement of said spring 20 in the pinion 18. Figs. 5 and 6 illustrate an electrode lead comprising a tungsten wire 125 welded to a nickel wire 136 and with a sleeve 128 of glass such as a boro-silicate glass mounted about the tungsten part. Such an electrode and sleeve is mounted in the machine with said tungsten wire 125 extending into the upper end of said bore 39 and resting on the upper end of said wire spindle 46 and with said sleeve 128 resting on said surface 48. At the commencement of the movement of a particular spindle set from this position A said dog 34 will pass by said dog 60 and be released from engagement therewith through the rotation of said dog 34 and collar 30 about the axis of said collar whereby said hollow spindles or sleeves 24 and 38 are freed for the frictional engagement of said spring 20 whereby said pinion 18 again causes these sleeves to rotate. As each of the spindle sets passes through the position A it is loaded with a lead and glass sleeve unit. As each successive spindle set comes into the position B the flange 50 leaves the cam surface 112 and the boss 52 passes into a position over the operating end of said lever 70, said cam 98 being timed with respect to such movement into position B to have the operating end of said lever at its lowermost position through action of said spring 102. In position B the upper end of the glass sleeve, in the position shown in Fig. 4 with respect to said sleeve 38, is subjected to heat from flames on said jets 116 whereby it is melted and fused to said wire 125. The rotation of said cam 98 is also timed with respect to said movement into position to engage said roller 96 at a predetermined time after the bringing of said sleeve 128 into fusing relation with said flame, say for a period of 10 or 15 seconds, whereby the outer end of lever 70 is depressed and the inner or operating end thereof is raised against said boss 52 to push said spindles 40, 44 and 46 upwardly through a predetermined distance whereby said wire 125 and the sleeve 128 fused thereto are also raised and the lower end of said sleeve 128 is lifted from heat conducting relation with said sleeve 38 and into the more direct influence of the flames from said jets 116. The intermittent rest period of said spider 10 and the spindles carried thereon continues until said lower part of said sleeve 128 is fused to said wire 125. During the rest or fusing period the wire 125 and glass sleeve carried thereby will be rotated in the flames by the supporting spindles to form a suitable gas tight fusion joint between said wire and said glass. At the termination of this rest period and upon movement of a particular spindle therefrom the corresponding boss 52 will leave the end of said lever 70 and engage the said cam surface 108 whereby it and the sliding spindles are again raised until the lower end of a wire 125 carried thereby is at or just below or just above said surface 48 whereby the wire 125 and sleeve 128 thereon will tip over from the spindles. During such tipping the centrifugal force of the rotational movement of the machine will throw the wire and sleeve unit outwardly and at this time they will engage said edge 122 of chute 120 whereby they will be discharged between said guides 124 and 126 and will slide to a catch receiver at the discharge end of said chute. The parts of the machine are formed and designed whereby this tipping action culminates as or just before the spindle comes to rest at said position C. As the spindle leaves this position C said boss 52 passes from operable relation with said cam surface 108 and said collar or flange 50 passes into operable relation with said cam surface 112 whereby said spindles 46, 46 and 46 are drawn downwardly to their lowermost position before the spindle reaches said position A so that the spindle will be again ready for loading. In this manner successive loadings of successive spindles as they pass through position A will provide a continuous succession of wires and sleeves which are fused thereto at position B and discharged at position C.

While I have shown and described and have pointed out in the annexed claims certain novel features of the invention, it will be understood that various omissions, substitutions and changes in the forms and details of the device illustrated and in its operation may be made by those skilled in the art without departing from the spirit of the invention.

I claim:

1. In a machine for fusing glass sleeves on metal stems, in combination, means for supporting a stem substantially vertically, means for supporting a glass sleeve about said stem in a predetermined position with respect to said stem, first said means being movable axially with respect to a stem held thereby, means for heating said sleeve to fuse it about said stem, and means for moving said stem holding means to carry a sleeve fused to its stem away from said sleeve holding means and to bring the part of the sleeve which was adjacent to the sleeve holding means from that position and into a position within the influence of said heating means.

2. In a machine for fusing glass sleeves to metal stems, in combination, means for holding a stem substantially vertically, a rest member for supporting a glass sleeve about and in predetermined position with respect to said stem, a gas nozzle directed principally at the position of the upper part of said sleeve, and means for actuating said stem holding means to move a stem held thereby in a direction away from said rest member through a distance sufficient to move a sleeve having its upper portion fused to said stem to bring the lower portion of the sleeve from heat conducting influence of said rest member and into a position to be fused by heat from a flame on said nozzle.

3. In a machine for fusing glass sleeves to metal stems, in combination, means for holding a stem substantially vertically, a rest member for supporting a glass sleeve about and in predetermined position with respect to said stem, a gas nozzle directed principally at the position of the upper part of said sleeve, means for actuating said stem holding means to move a stem held thereby in a direction away from said rest member through a distance sufficient to move a sleeve having its upper portion fused to said stem to bring the lower portion thereof from heat conducting influence of said rest member and into a position to be fused by heat from a flame on said nozzle, and means for rendering said stem holding means inoperative as a holding means.

4. In a machine for fusing glass sleeves to metal stems, in combination, means for holding a stem substantially vertically, a rest member for supporting a glass sleeve in predetermined position with respect to said stem, a gas nozzle directed principally at the upper part of said sleeve, means for moving the stem through a distance sufficient to move a sleeve having its upper portion fused to said stem to bring the lower portion thereof from heat conducting influence of said rest member and into a position to be fused by heat from a flame on said nozzle, and means automatically operable at a predetermined time after such movement for rendering said stem holding means inoperative as a holding means.

5. In a machine for fusing glass sleeves onto metal stems, in combination, means for supporting a stem in a substantially vertical position comprising a member having a substantially vertical bore therein, a member movable longitudinally in said bore, said bore being restricted at its upper end to provide a supporting edge for a stem inserted therein and resting on an upper end of said slidable member and to provide a rest for a sleeve about a stem so positioned, a gas jet nozzle directed toward the position of said sleeve, and means for moving said slidable means upwardly through a predetermined distance to a new operating position with respect to said gas jet and said sleeve supporting means.

6. In a machine for fusing glass sleeves onto metal stems, in combination, means for supporting a stem in a substantially vertical position comprising a member having a substantially vertical bore therein, a member movable longitudinally in said bore, said bore being restricted at its upper end to provide a supporting edge for a stem inserted therein and resting on an upper end of said slidable member and to provide a rest for a sleeve about a stem so positioned, a gas jet nozzle directed toward the position of said sleeve, and automatic means for moving said slidable means upwardly in two steps each of predetermined distance and with a predetermined time interval between the steps.

7. In glass working machinery, in combination, means for supporting a stem in a substantially vertical position comprising a member having a substantially vertical bore therein, a member movable longitudinally in said bore, said bore being restricted at its upper end to provide a supporting edge for a stem inserted therein and resting on an upper end of said slidable member and to provide a rest for a sleeve about a stem so positioned, a gas jet nozzle directed toward the position of said sleeve, and means for moving said slidable member in upward steps, whereby said stem and sleeve are moved to a plurality of positions with respect to the supporting edge of said bore.

8. In automatic glass working machinery, in combination, means for supporting a stem in a substantially vertical position comprising a member having a substantially vertical bore therein, a member movable longitudinally in said bore, said bore being restricted at its upper end to provide a supporting edge for a stem inserted therein and resting on an upper end of said slidable member and to provide a rest for a sleeve about a stem so positioned, a gas jet nozzle directed toward the position of said sleeve, means for moving said stem and sleeve holding means in steps into operative relation with said gas flame nozzle and out of influence therein with a predetermined time duration between the steps, and means for moving said slidable means upwardly through a predetermined distance while the sleeve is within the influence of said flame to carry the lower part of a partly fused sleeve from heat conducting influence of said rest.

9. In automatic glass working machinery, in combination, means for supporting a stem in a subtantially vertical position comprising a member having a substantially vertical bore therein, a member movable longitudinally in said bore, said bore being restricted at its upper end to provide a supporting edge for a stem inserted therein and resting on an upper end of said slidable member and to provide a rest for a sleeve about a stem so positioned, a gas jet nozzle directed toward the position of said sleeve, means for moving said stem and sleeve holding means in steps into operative relation with said gas flame nozzle and out of influence therein with a predetermined time duration between the steps, means for moving said slidable means upwardly through a predetermined distance while the sleeve is within the influence of said flame to carry the lower part of a partly fused sleeve from heat conducting influence of said rest, and means for rendering said stem holding means inoperative as a holding means after the movement thereof from operable relation to said gas jet.

10. In automatic glass working machinery, in combination, means for supporting a stem in a substantially vertical position comprising a member having a substantially vertical bore therein, a member movable longitudinally in said bore, said bore being restricted at its upper end to provide a supporting edge for a stem inserted therein and resting on an upper end of said slidable member and to provide a rest for a sleeve about a stem so positioned, a gas jet nozzle directed toward the position of said sleeve, means for moving said stem and sleeve holding means in steps into operative relation with said gas flame nozzle and out of influence therein with a predetermined time duration between the steps, means for moving said slidable means upwardly through a predetermined distance while the sleeve is within the influence of said flame to carry the lower part of a partly fused sleeve from heat conducting influence of said rest, means for rendering said stem holding means inoperative as a holding means after the movement thereof from operable relation to said gas jet, and means engageable by a stem so released and upon its movement from the jet to impel it in a given discharge direction.

11. In automatic glass working machinery, in combination, means for supporting a stem in a substantially vertical position comprising a member having a substantially vertical bore therein, a member movable longitudinally in said bore, said bore being restricted at its upper end to provide a supporting edge for a stem inserted therein and resting on an upper end of said slidable member and to provide a rest for a sleeve about a stem so positioned, a gas jet nozzle directed toward the position of said sleeve, means for moving said stem and sleeve holding means in steps into operative relation with said gas flame nozzle and out of influence therein with a predetermined time duration between the steps, means for moving said slidable means upwardly through a predetermined distance while the sleeve is within the influence of said flame to carry the lower part of a partly fused sleeve from heat conducting influence of said rest, means for rendering said stem holding means inoperative as a holding means after the movement thereof from operative relation to said gas jet, and means engageable by a stem so released and upon its movement from the jet to impel it in a given discharge direction comprising slideway having an edge positioned to engage such a stem as it is so moved and released from its holding means and to tip it onto said slideway.

12. In a glass working machine, a glass fusing heater, means for holding a stem with a glass sleeve thereon in a predetermined position with respect to said heater until a portion of said sleeve is fused to said stem and means for moving said stem and sleeve longitudinally to expose another portion of said sleeve to said heater.

13. In a glass working machine, a glass fusing heater, means for holding a stem, means for holding a glass sleeve about said stem in predetermined position with respect to said heater and means for moving said stem upwardly after said sleeve has been fused thereto at a given place to carry said sleeve away from said sleeve holding means.

14. In a glass working machine, a glass fusing heater, means for holding a stem, means for holding a glass sleeve about said stem in predetermined position to and in fusing relation with respect to said heater, and means for moving said stem and a sleeve partially fused thereto to carry said sleeve away from said sleeve holding means, and to a position within the influence of said heater.

15. In a glass working machine, means for holding a stem, means for holding a sleeve about said stem, a glass fusing heater for heating said sleeve, and means for moving said stem upwardly to carry said sleeve away from said sleeve holding means and to a position within the influence of said heater.

16. The method of forming a member in the nature of a wire with a sleeve of glass fused thereonto which consists in supporting the wire and supporting the sleeve at a given part about said wire, applying a flame to the unsupported part of said sleeve and fusing it thereat to said wire, moving the wire to carry the sleeve away from its support and completing the fusing of the sleeve onto the wire.

Signed at Hoboken in the county of Hudson and State of New Jersey this 23rd day of December A. D. 1926.

GEORGE A. MILLAR.